United States Patent [19]

Kubota et al.

[11] 3,852,394

[45] Dec. 3, 1974

[54] THERMOPLASTIC POLYCARBONATE/POLYBUTADIENE-METHACRYLATE-STYRENE GRAFT POLYMER/STYRENE-ACRYLONITRILE COPOLYMER BLENDS

[75] Inventors: Hiroaki Kubota; Yoshithugu Nakamura; Ryoichi Hasegawa, all of Iwakuni, Japan

[73] Assignee: Teijin Limited, Osaka, Japan

[22] Filed: Dec. 27, 1972

[21] Appl. No.: 318,703

[30] Foreign Application Priority Data
Dec. 29, 1971  Japan .................................. 46-2837

[52] U.S. Cl. ........ 260/873, 260/37 PC, 260/45.7 R, 260/45.75 R, 260/45.95, 260/DIG. 24
[51] Int. Cl. ...................... C08g 39/10, C08g 51/58
[58] Field of Search ........... 260/873, 45.7 R, 45.95, 260/DIG. 24

[56] References Cited
UNITED STATES PATENTS

| | | | |
|---|---|---|---|
| 3,162,695 | 12/1964 | Grabowski | 260/873 |
| 3,624,024 | 11/1971 | Caldwell | 260/DIG. 24 |
| 3,649,712 | 3/1972 | Grabowski | 260/873 |

FOREIGN PATENTS OR APPLICATIONS

| | | | |
|---|---|---|---|
| 854,475 | 11/1960 | Great Britain | 260/873 |

*Primary Examiner*—William H. Short
*Assistant Examiner*—T. Pertilla
*Attorney, Agent, or Firm*—Sherman & Shalloway

[57] ABSTRACT

A thermoplastic resinous composition (D) comprising

A. a resin obtained by graft polymerizing 90 – 10 parts by weight of a monomeric mixture consisting of 90 – 10 percent by weight of a monomeric methacrylic acid ester and 10–90 percent by weight of an aromatic vinyl monomer, in the presence of 10 – 90 parts by weight of a polybutadiene or butadiene copolymer containing at least 50 percent by weight of butadiene unit;
B. a thermoplastic resin obtained by copolymerizing an aromatic vinyl monomer with 15 – 70 percent by weight of said aromatic monomer of a vinyl cyanide monomer; and
C. a polycarbonate resin derived from a (4,4'-dihydroxy diphenyl)alkane;

with the provision that the ratio of the total amount contained of the resin (A) and the thermoplastic resin (B) to resin (C) is in the range of 70:30 – 10:90, and that polybutadiene or the butadiene copolymer component containing at least 50 percent by weight of butadiene unit is contained in an amount of 5 – 50 percent by weight of the total amount contained of the resin (A) and the thermoplastic resin (B).

2 Claims, 5 Drawing Figures

THERMOPLASTIC POLYCARBONATE/POLYBUTADIENE-METHACRYLATE-STYRENE GRAFT POLYMER/STYRENE-ACRYLONITRILE COPOLYMER BLENDS

This invention relates to thermoplastic resinous compositions which excel in moldability and particularly in mechanical properties. More specifically, the invention relates to a polycarbonate resin-containing thermoplastic composition, which possesses a melt viscosity that makes for convenience of its molding and moreover excels particularly in its impact strength.

Polycarbonate resins derived from (4,4'-dihydroxydiphenyl)alkanes (hereinafter to be referred to merely as polycarbonate resins) possess a high impact strength and excel in other properties. However, their moldability is poor because of their too high melt viscosity. Further, even with respect to the foregoing impact strength, they possess the drawback that an extreme drop takes place in the impact strength as the thickness of the resinous specimen increases (for example, the Izod notched impact strength in accordance with the ASTM Method D-256-56 of a ⅛-inch rod is about 90 kg-cm/cm, a high value, whereas that of a ¼-inch rod declines to a mere 15 kg-cm/cm).

As a method of improving the moldability of the polycarbonate resins, there has been proposed a thermoplastic resinous composition consisting of a polycarbonate resin and a graft copolymer obtained by grafting monomeric vinyl compounds on polybutadiene or its copolymer. For instance the prior art discloses, a composition consisting of a polycarbonate resin and a graft copolymer obtained by grafting styrene and acrylonitrile onto polybutadiene (Japanese Pat. No. 15225/63) or a composition consisting of a polycarbonate resin and a graft copolymer obtained by grafting styrene and methyl methacrylate onto a butadiene-styrene copolymer latex (Japanese Pat. No. 71/64) or a composition consisting of a polycarbonate resin and a graft copolymer obtained by grafting methyl methacrylate, styrene and acrylonitrile onto a butadiene-styrene copolymer latex (Japanese Pat. No. 11496/67).

However, these conventional compositions could not improve the hereinbefore-indicated decline in the impact strength of the polycarbonate resin.

Again, a proposal has also been made to improve the moldability of the polycarbonate resins by incorporating with the polycarbonate resin a styrene acrylonitrile copolymer resin (British Pat. Specification No. 854,475). However, the composition obtained in this case is poor in its mechanical properties because of the poor compatibility between the polycarbonate resin and the styrene-acrylonitrile copolymer.

It is therefore the object of the present invention to provide a polycarbonate resin-containing thermoplastic composition excelling in moldability and mechanical properties, and especially one in which there is no decline in the impact strength.

The foregoing object of the invention is achieved by a thermoplastic resinous composition (D) comprising a resin (A) obtained by graft copolymerizing 90 – 10 parts by weight of a monomeric mixture consisting of 90 – 10 parts by weight of a monomeric methacrylic acid ester and 10 – 90 percent by weight of an aromatic vinyl monomer, in the presence of 10 – 90 parts by weight of a polybutadiene or a butadiene copolymer containing at least 50 percent by weight of butadiene unit; a thermoplastic resin (B) obtained by copolymerizing an aromatic vinyl monomer with 15 – 70 percent by weight of said aromatic monomer of a vinyl cyanide monomer; and a polycarbonate resin (C), with the provision that the ratio of the total amount contained of the resin (A) and the thermoplastic resin (B) to the resin (C) is in the range of 70:30 – 10:90, and that the polybutadiene or the butadiene copolymer component containing at least 50 percent by weight of butadiene is contained in an amount of 5 – 50 percent by weight of the total amount contained of the resin (A) and the thermoplastic resin (B).

The possession of excellent moldability and mechanical properties, and especially superior impact strength, by the thermoplastic resinous composition obtained by the present invention is believed to be due to its unique compositional structure as shown in FIG. 1.

Figure 1:
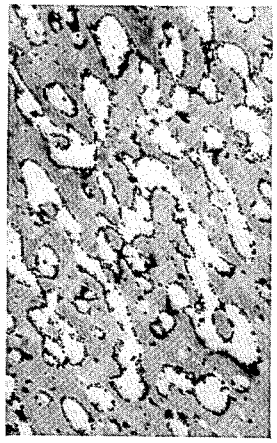
FIG. 1 is an electron microscopic photograph of a thermoplastic resinous composition consisting of a resin (A) of a polybutadiene-methyl methacrylate-styrene graft copolymer, a thermoplastic resin (B) of a styrene-acrylonitrile copolymer, and a polycarbonate resin (C).
Figure 2:
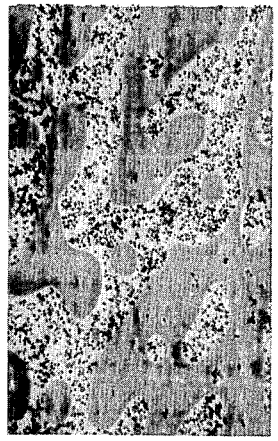
FIG. 2 is an electron microscopic photograph of a conventional resinous composition consisting of a polybutadiene-styrene-acrylonitrile graft copolymer, a styrene-acrylonitrile copolymer and a polycarbonate resin.
Figure 3:
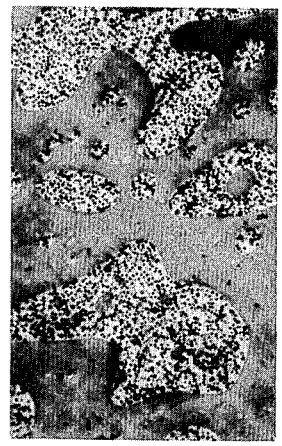
FIG. 3 is an electron microscopic photograph of a resinous composition consisting of a polybutadiene-methyl methacrylate-styrene graft copolymer, a methyl methacrylate-styrene copolymer and a polycarbonate resin.
Figure 4:
FIG. 4 is an electron microscopic photograph of a resinous composition consisting of a polybutadiene-styrene-acrylonitrile graft copolymer, a methyl methacrylate-styrene copolymer and a polycarbonate resin.
Figure 5:
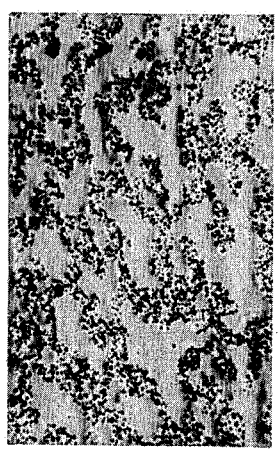
FIG. 5 is an electron microscopic photograph of a resinous composition consisting of a polybutadiene-methyl methacrylate styrene-acrylonitrile graft copolymer and a polycarbonate resin.

When the electron microscopic photographs of FIGS. 1 – 5 are compared, it is noted that whereas the particles of the butadiene-containing copolymer (the graft rubber component) are uniformly dispersed in the resinous components other than the polycarbonate resin in the case of the compositions shown in FIGS. 2, 3, 4, and 5, the thermoplastic resinous composition shown in FIG. 1 alone has a unique structure in that its butadiene-containing copolymer (graft rubber component) particles are concentrated at the interface of the styrene-acrylonitrile copolymer and the polycarbonate resin. It is inferred that in the case of a structure such as this the particles of the butadiene-containing copolymer (graft rubber component) gather at the microphase-separated interface (where given stress is concentrated) to raise the concentration of the grafted rubber component particles, and thus increase the impact strength even though the rubber content is small, as well as to provide the composition with other excellent properties.

While it is not known for certain, the above-described unique structure of the thermoplastic resin of the present invention is believed to result from the compatibility of the several resinous components with the graft chain of the grafted rubber component particles.

The resin (A) used in the invention can be prepared by either the bulk, solution, suspension or emulsion polymerization methods, or a combination of these polymerization methods, say, the bulk-suspension polymerization method. When it is desired to prepare a resin (A) whose content of the rubber component is great, the resin is prepared preferably by the emulsion graft polymerization method. For instance, a butadiene polymer or copolymer latex is emulsion graft polymerized with a methyacrylic acid ester monomer and an aromatic vinyl monomer, and thereafter the resulting latex containing a butadiene-containing graft copolymer is solidified by means of an inorganic acid or an inorganic salt such as aluminum sulfate to obtain a white powder of the resin (A).

The butadiene polymer or copolymer (rubber component) used in the preparation of the resin (A) is used in an amount of 10 – 90 percent by weight, and preferably 30 – 70 percent by weight. If it is used in an amount less than 10 percent by weight, the impact strength of the resinous composition (D) obtained by mixing the resin (A) with the thermoplastic resin (B) and the polycarbonate resin (C) is low. On the other hand, when the resin (A) is used an amount in excess of 90 percent by weight, there is an objectional decline in the moldability as well as mechanical properties of the resinous composition (D).

As the methacrylic acid ester monomer to be graft polymerized to the aforesaid rubber component, mention can be made of such, for example, as methyl methacrylate, ethyl methacrylate, propyl methacrylate, isopropyl methacrylate and butyl methacrylate, of which methyl methacrylate and ethyl methacrylate are especially to be preferred. On the other hand, as the aromatic vinyl monomer, included are such, for example, as styrene, alpha-methylstyrene, vinyltoluene, vinylxylene, trimethylstyrene and halogenated styrenes, of which styrene is especially to be preferred. Other vinyl compounds may be substituted for a part of the foregoing aromatic vinyl monomers.

The foregoing methacrylic acid ester monomer is preferably used in an amount of 10 – 90 percent by weight of the sum total of the methacrylic acid ester monomer and aromatic vinyl monomer to be graft polymerized. If the amount used of the methacrylic acid ester monomer is less than 10 percent by weight, an objectionable decline takes place in the heat distortion temperature and impact strength of the resinous composition (D).

The thermoplastic resin (B) used in the invention may be prepared by any of such polymerization methods as bulk, solution, suspension and emulsion polymerization, as well as combinations of these methods.

The aromatic vinyl monomer used in the preparation of the thermoplastic resin (B) include such, for example, as styrene, alpha-methylstyrene, vinyltoluene, vinylxylene, trimethylstyrene and halogenated styrenes, of which styrene and alpha-methylstyrene are especially to be preferred. On the other hand, as the vinyl cyanide monomer, usable are such, for example, as acrylonitrile and methacrylonitrile.

The vinyl cyanide monomer is copolymerized with the aromatic vinyl monomer in an amount of 15–70 percent by weight of the latter. When the vinyl cyanide monomer is used in an amount less than 15 percent by weight in this case, the heat distortion temperature of the aforesaid resinous composition (D) is low. On the other hand, when the vinyl cyanide monomer is used in excess of 70 percent by weight, this also is undesirable, since the impact strength of the foregoing resinous composition (D) suffers.

The polycarbonate resin (C) used in this invention is an aromatic polycarbonate resin, and is particularly a 4,4'-dihydroxydiphenylalkane type polycarbonate resin. More specifically, preferred is the polycarbonate resin obtained by either the ester-exchange or phosgene method, using 2,2-(4,4'-dihydroxydiphenyl)propane (hereinafter abbreviated to bisphenol A) as the dihydroxy component. Further, a part or all of the bisphenol A may be substituted by other 4,4'-dihydroxydiphenylalkanes or 4,4'-dihydroxydiphenylsulfone or 4,4'-dihydroxydiphenylether. Again, two or more of these aromatic polycarbonate resins may be used conjointly.

In preparing the resinous composition (D) by blending the resin (A), the thermoplastic resin (B) and the polycarbonate resin (C), any of the known methods (e.g., the methods of using a Banbury mixer, heated rolls or screw extruders of single or multiple type) can be employed in the present invention. Again, there is imposed no particular restriction as to the sequence in blending the three components in obtaining the resinous composition (D). A preferred method is to mix the resin (A), the thermoplastic resin (B) and the polycarbonate resin (C) at the same time and then extruding this mixture through an extruder. Again, a method consisting of first forming a resinous composition (E) from the resin (A) and the thermoplastic resin (B) and then mixing this resinous composition (E) with the polycarbonate resin (C) is also useful. The latter method is especially preferred when preparing the resin (A) and the thermoplastic resin (B) by the emulsion polymerization method. For instance, a resinous composition (E) is first formed by blending the resin (A) and the thermoplastic resin (B) in their latex state followed by coagulating, washing and drying, according to a known method, and thereafter the polycarbonate resin (C) is blended with the resulting resinous composition (E). Other methods may be also used. For instance, a resinous composition (F) can be formed first from the resin (A) and the polycarbonate resin (C), and then this resinous composition (F) can be blended with the thermoplastic resin (B), or a resinous composition (G) can be formed from the thermoplastic resin (B) and the polycarbonate resin (C), and then this resinous composition (G) can be blended with the resin (A). In any case, a resinous composition (D) having the same structure as that of the electron microscopic photograph shown in FIG. 1 can be obtained.

In the foregoing methods of preparing the resinous composition (D), the proportion in which the resin (A), the thermoplastic resin (B) and the polycarbonate resin (C) are blended, must be such that the weight ratio of polycarbonate resin (C) to resin (A) and thermoplastic resin (B) is 30:70 – 90:10, and furthermore the polybutadiene or the butadiene copolymer component containing at least 50 percent by weight of butadiene unit must be contained in the resinous composition (D) in an amount of 5 – 50 percent by weight of resin (A) and thermoplastic resin (B).

The resinous composition (D) obtained by the present invention may contain the various additives, pigments, fillers, stabilizers and flame retardants.

Especially, when a flame retardant is incorporated in the thermoplastic resinous composition (D), a non-flammable resinous composition having excellent properties (e.g., a high heat distortion temperature and a high impact strength as well as good moldability) not possessed by the conventional non-flammable resins can be obtained.

As flame retardant that can be used, mention can be made of such, for example, as hexabromobenzene, tetrabromobisphenol A, tetrabromophthalic anhydride and the carbonate oligomers containing halogenated bisphenol A (e.g., the carbonate oligomers derived from tetrabromobisphenol A, the molecular ends of which are terminated by either phenol, alkylphenols or halogenated phenols).

Further, as required, a co-flame-retardant assistant such, for example, as antimony trioxide may also be used together with the flame retardant agent.

Thus, as hereinbefore described, the resinous composition (D) obtained in accordance with the present invention consists of a resin (A) of a specific butadiene-containing graft copolymer, a thermoplastic resin (B) of a specific vinyl type copolymer and a polycarbonate resin (C). And since it has a unique structure in that the resin (A) is concentrated at the interface between the thermoplastic resin (B) and the polycarbonate resin (C), it has excellent moldability and mechanical properties, and especially impact strength, the achievement of which were not possible at all by the conventional resinous compositions.

Further, the resinous composition imparted non-flammability has excellent properties, e.g, a high distortion temperature and a high impact strength, not possessed by the non-flammable resinous compositions obtained by the conventional methods.

The following examples are given for more fully illustrating the present invention. In the examples the parts and percentages are all on a weight basis. The impact strength was measured in accordance with the ASTM D-256, and the heat distortion temperature was determined in accordance with the ASTM Method D-648. The melt viscosity was obtained by using a plunger type melt-flow tester (originated with the High Polymer Society of Japan) and forcing the resin to flow out from a nozzle 1 mm in diameter and 10 mm long under a pressure of 100 kg/cm$^2$ and then calculating as follows:

Melt viscosity = $[1.44/\text{Amount of plunger descent in 1 minute(mm)}] \times 10^5$.

On the other hand, the graft rate was obtained as follows:

Degree of grafting (percent)

$$= \frac{\text{Weight of acetone-insoluble portion}}{\text{Weight of rubber component}} - 1 \times 100$$

wherein the weight of the acetone-insoluble portion was obtained by immersing the graft copolymer thoroughly in acetone, following which the insoluble precipitate was rigorously collected by centrifugation and weighed.

EXAMPLES 1 – 5 AND CONTROLS 1 – 2

Resin (A), thermoplastic resin (B) and polycarbonate resin (C), which were prepared in the following manner, were used.

Preparation of resin (A)

Sixty parts (as solids portion) of a polybutadiene latex, 1 part of disproportionated potassium citronellate, 200 parts of water (inclusive of the water of the latex), 0.005 part of ferrous sulfate, 0.01 part of disodium ethylenediaminetetraacetate and 0.19 part of formaldehyde sodium sulfoxylate were placed in a polymerization kettle, following which the mixture was heated at 60°C. Then a monomeric mixture consisting of 24 parts of methyl methacrylate, 16 parts of styrene and 0.2 part of cumene hydroperoxide was added dropwise with stirring during a 2-hour period, after which the polymerization reaction was practically completed by continuing the stirring for a further 2 hours. To the latex, after its polymerization, was added 0.5 PHR of hindered phenol, following which the latex was coagulated in customary manner in an aqueous aluminum sulfate solution and thereafter filtered, washed and dried to obtain a white powder of a graft copolymer whose degree of grafting graft was 43 percent.

Preparation of thermoplastic resin (B)

One part of disproportionated potassium citronellate, 200 parts of water, 0.005 part of ferrous sulfate, 0.01 part of disodium ethylenediaminetetraacetate and 0.19 part of fomaldehyde sodium sulfoxylate were placed in a polymerization kettle, and while heating the mixture at a temperature of 60°C. with stirring a monomeric combined solution consisting of 70 parts of styrene, 30 parts of acrylonitrile and 0.2 part of cumene hydroperoxide was added dropwise during a period of 4 hours. The stirring was then continued for a further 2 hours, and the polymerization reaction was practically completed. The latex, after its polymerization, was coagulated with dilute sulfuric acid and thereafter filtered, washed and dried to obtain a white powder of a copolymer containing 29 percent by weight of acrylonitrile.

Polycarbonate resin (C)

A polycarbonate resin (LW-1250 produced by Teijin Chemical Co.) prepared by the so-called phosgene method, using methylene chloride as a reaction solvent and bisphenol A and phosgene as starting material, and having the following properties was used.

| | |
|---|---|
| Molecular weight | 25,000 |
| Impact strength(Izod,notched) | 15 kg-cm/cm (¼ inch rod) |
| | 92 kg-cm/cm (⅛ inch rod) |
| Heat distortion temperature (264 psi) | 135°C. |
| Melt viscosity (260°C.) | 18.5 × 10$^3$ poises |

The foregoing three components were mixed in various proportions and then molded into pellets at a temperature of 250°C., using an extruder. This was followed by the preparation of the test pieces using an injection molding machine followed by measurement of the various properties. The results obtained are shown in Table 1. FIG. 1 shows an electon microscopic photograph of the specimen obtained in accordance with Example 3.

Table 1

|  | 1 | 2 | Example 3 | 4 | 5 | Control 1 | 2 |
|---|---|---|---|---|---|---|---|
| Resin (A) (%) | 17.5 | 15.0 | 11.3 | 7.5 | 2.5 | 0 | 25 |
| Thermoplastic resin (B) (%) | 52.5 | 45.0 | 33.7 | 22.5 | 7.5 | 0 | 75 |
| Polycarbonate resin (C) (%) | 30.0 | 40.0 | 55.0 | 70.0 | 90.0 | 100 | 0 |
| Impact strength (kg.cm/cm) | | | | | | | |
| ¼ inch | 21 | 30 | 42 | 58 | 35 | 15 | 10 |
| ⅛ inch | 32 | 38 | 49 | 61 | 77 | 93 | 12 |
| Heat distortion temperature (264 psi, °C.) | 102 | 105 | 110 | 119 | 132 | 135 | 90 |
| Melt viscosity (260°C., $10^3$ poises) | 4.5 | 5.5 | 7.3 | 11.0 | 12.8 | 18.5 | 6.0 |

In Examples 1 – 5 of the foregoing table, the content of the butadiene in the resin (A) and thermoplastic resin (B) is 15 percent by weight of resin (A) plus thermoplastic resin (B).

As is apparent from the foregoing table, the resinous compositions of Examples 1 – 5 demonstrate a marked improvement in their moldability as compared with the polycarbonate resin. In addition, there is a marked improvement in the impact strength, and especially in the case of a specimen of greater thickness such as a ¼-inch rod. It can thus be seen that the dependence of Izod impact strength on thickness of test pieces in Examples 1–5 is exceedingly small and well improved.

EXAMPLES 6 – 10 AND CONTROLS 3 – 5

Resin (A), thermoplastic resin (B) and polycarbonate resin (C), which were prepared in the following manner, were used.

Preparation of resin (A)

Sixty parts (as solids portion) of a styrene-butadiene latex, 1.0 part of disproportionated potassium citronellate, 200 parts of water (inclusive of the water contained in the latex), 0.005 part of ferrous sulfate, 0.01 part of disodium ethylenediaminetetraacetate and 0.19 part of formaldehyde sodium sulfoxylate were placed in a polymerization kettle and heated at a temperature of 60°C. Then, while stirring the mixture, a monomeric combined solution consisting of 26 parts of methyl methacrylate, 14 parts of styrene and 0.2 part of cumene hydroperoxide was added dropwise during a period of 2.5 hours. This was followed by continuing the stirring for a further 2 hours, whereupon the polymerization reaction was practically completed. 1.0 PHR of hindered phenol was then added to the polymerized latex, and it was coagulated in an aqueous aluminum sulfate solution in customary manner followed by filtration, washing and drying to obtain a white powder of a graft copolymer having the degree of grafting 57 percent.

Preparation of thermoplastic resin (B)

Exactly the same resin as that used in Examples 1 – 5 was used.

Polycarbonate resin (C)

A polycarbonate resin (Lexan 101 produced by General Electric Co.) having the following properties was used.

| | |
|---|---|
| Impact strength (Izod, notched) | 13 kg-cm/cm (¼ in.rod) 89 kg-cm/cm (⅛ in.rod) |
| Heat distortion temperature (264 psi) | 134°C. |
| Melt viscosity (260°C.) | 22.5×$10^3$ poises |

Of the foregoing three components, the polycarbonate resin (C) was used in a fixed proportion of 70 percent, whereas the proportions in which the resin (A) was used relative to the thermoplastic resin (B) were varied, and the amount of the rubber component contained in resin (A) plus thermoplastic resin (B) was also varied in carrying out the experiment as in Examples 1 – 5. The properties of the specimens obtained were measured with the results shown in Table 2.

Table 2

|  | Control 3 | 4 | 6 | Example 7 | 8 | 9 | 10 | Control 5 |
|---|---|---|---|---|---|---|---|---|
| Resin (A) (%) | 0.5 | 1.5 | 2.5 | 5.0 | 10.0 | 17.5 | 25.0 | 27.5 |
| Thermoplastic resin (B) (%) | 29.5 | 28.5 | 27.5 | 25.0 | 20.0 | 12.5 | 5.0 | 2.5 |
| Polycarbonate resin (C) (%) | 70.0 | 70.0 | 70.0 | 70.0 | 70.0 | 70.0 | 70.0 | 70.0 |
| Styrene-butadiene copolymer × 100 (%) / Resin (A)+Thermoplastic resin(B) | 1.0 | 3.0 | 5.0 | 10.0 | 20.0 | 35.0 | 50.0 | 55.0 |
| Impact strength (kg.cm/cm) | | | | | | | | |
| ¼ in.rod | 7.5 | 11.1 | 20.3 | 41.8 | 59.2 | 63.9 | 62.3 | 61.5 |
| ⅛ in.rod | 8.2 | 13.4 | 25.2 | 53.0 | 70.7 | 73.1 | 71.6 | 69.8 |
| Heat distortion temperature (264 psi, °C.) | 117.0 | 116.5 | 116.3 | 115.7 | 113.4 | 109.6 | 100.6 | 96.2 |
| Melt viscosity ($10^3$ poises) (measured at 260°C.) | 4.8 | 4.9 | 5.2 | 5.8 | 7.7 | 11.0 | 15.3 | 19.5 |

From the foregoing table, it can be seen that when the content of rubber component is 5 – 50 percent of resin (A) plus thermoplastic resin (B), the composition has excellent properties. On the other hand, when the content of rubber component is less than 5 percent, the impact strength is not adequate. Again, when the content of rubber component exceeds 50 percent, the heat distortion temperature declines and, in addition, the moldability is not improved.

EXAMPLES 11 – 13 AND CONTROLS 6 – 9

The resin (A) and thermoplastic resin (B) were prepared as in Examples 1 – 5, using the compositions of the starting materials indicated in Table 3. Using the same polycarbonate resin (C) as that used in Example 1 – 5, the three components were mixed as in Examples 1 – 5 to obtain the test pieces. The results obtained are shown in Table 3.

to obtain a power of a resinous composition (E). The impact strength of a molded article of the resinous composition (E) was 6 kg-cm/cm. Forty five percent of the powder of resinous composition (E) was then mixed with 55 percent of a polycarbonate resin (C) (LW–1250 produced by Teijin Chemical Co.), following which the mixture was molded into pellets at a temperature of 260°C. with an extruder. The so obtained pellets were prepared into test pieces by injection molding, and the properties of these test pieces were measured. As a result, the impact strength was 47 kg-cm/cm (¼-inch), the tensile yield strength was 640 kg/cm$^2$, and the heat distortion temperature was 111°C. (264 psi). Further, its oxygen index in accordance with the ASTM Method D–2863 was 23.0, thus demonstrating its non-flammability.

EXAMPLES 15 – 21

Table 3

|  | Example 11 | 12 | 13 | Control 6 | 7 | 8 | 9 |
|---|---|---|---|---|---|---|---|
| Resin (A) (%) | 12.5 | 12.5 | 12.5 | 12.5 | 12.5 | 12.5 | 50.00 |
| Polybutadiene (%) | 60 | 60 | 60 | 60 | 60 | 60 | 15 |
| Methylmethacrylate (%) | 24 | 24 | 16 | 0 | 24 | 0 | 6.0 |
| Styrene (%) | 16 | 16 | 24 | 28 | 16 | 28 | 56.5 |
| Acrylonitrile (%) | 0 | 0 | 0 | 12 | 0 | 12 | 22.5 |
| Thermoplastic resin (B) (%) | 37.5 | 37.5 | 37.5 | 37.5 | 37.5 | 37.5 | 0 |
| Styrene (%) | 70 | 80 | 70 | 70 | 55 | 40 | — |
| Acrylonitrile (%) | 30 | 20 | 30 | 30 | 0 | 0 | — |
| Methylmethacrylate (%) | 0 | 0 | 0 | 0 | 45 | 60 | — |
| Polycarbonate resin(C) (%) | 50.0 | 50.0 | 50.0 | 50.0 | 50.0 | 50.0 | 50.0 |
| Impact strength(kg.cm/cm) ¼ inch | 39 | 30 | 33 | 11 | 12 | 11 | 17 |
| Heat distortion temperature(264 psi,°C.) | 108 | 102 | 106 | 104 | 98 | 103 | 101 |
| Melt viscosity (260°C., 10$^3$ poises) | 6.5 | 8.0 | 5.0 | 8.1 | 2.2 | 5.1 | 11.0 |

From the foregoing table, it can be seen that resinous compositions of Examples 11 – 13 have good moldability as well as high impact strength. The electron microscopic photographs of Controls 6, 7, 8 and 9 are shown in FIGS. 2, 3, 4 and 5, respectively. None of the resinous compositions of the control experiments possess a structure like that of the resinous composition of Example 3 (FIG. 1).

EXAMPLE 14

In polymerizing the resin (A) and thermoplastic resin (B) used in Examples 1 – 5, the styrene was wholly substituted by nuclear substituted monochlorostyrene to obtain a resin (A) latex and a thermoplastic resin (B) latex. These two components were then mixed such that the polybutadiene content would become 15 percent, after which the mixture was coagulated in dilute sulfuric acid followed by filtration, washing and drying The same resin (A), thermoplastic resin (B) and polycarbonate resin (C) as those used in Examples 1 – 5 were used, to which was further added at least one flame retardant selected from the group consisting of hexabromobenzene; a carbonate oligomer derived from tetrabromobisphenol A, the molecular ends of which are terminated by a halogenated phenol, tetrabromobisphenol A; and tetrabromophthalic anhydride. Antimony trioxide was also added in the amounts indicated in Table 4. This mixture was then extruded into pellets at a temperature of 250°C. with an extruder, followed by the preparation of test pieces with an injection molding machine and measurement of the properties of the so obtained test pieces. The results obtained are shown in Table 4.

It can be seen from Table 4 that non-flammable resins having exceedingly excellent properties were obtained.

Table 4

|  | Example 15 | 16 | 17 | 18 | 19 | 20 | 21 |
|---|---|---|---|---|---|---|---|
| Resin (A) (%) | 18.7 | 11.7 | 14.6 | 11.7 | 11.7 | 11.7 | 11.7 |
| Thermoplastic resin(B) (%) | 26.3 | 23.3 | 20.4 | 23.3 | 23.3 | 23.3 | 23.3 |
| Polycarbonate resin(C) (%) | 55.0 | 65.0 | 65.0 | 65.0 | 65.0 | 65.0 | 65.0 |
| Polybutadiene × 100(%) / Resin(A)+Thermoplastic resin(B) | 25.0 | 20.0 | 25.0 | 20.0 | 20.0 | 20.0 | 20.0 |
| Flame redardant(A)(PHR) | 13.8 | 15.0 | 15.0 | — | — | — | — |
| do. (B)(PHR) | — | — | — | 4.5 | 3.4 | 2.3 | 13.5 |
| do. (C)(PHR) | — | — | — | — | 1.1 | — | — |
| do. (D)(PHR) | — | — | — | — | — | 2.2 | — |

Table 4 — Continued

| | Example | | | | | | |
|---|---|---|---|---|---|---|---|
| | 15 | 16 | 17 | 18 | 19 | 20 | 21 |
| Antimony trioxide (PHR) | 4.2 | 5.0 | 5.0 | 1.5 | 1.5 | 1.5 | 4.5 |
| Impact strength(kg.cm/cm) | | | | | | | |
| ¼ inch | 32 | 21 | 29 | 48 | 47 | 49 | 42 |
| ⅛ inch | 51 | 49 | 58 | 62 | 64 | 63 | 62 |
| Heat distortion temperature(264psi,°C.) | 102 | 106 | 105 | 118 | 114 | 112 | 115 |
| Melt viscosity (260°C., 10 poises) | 4.2 | 4.0 | 5.6 | 5.3 | 4.4 | 4.6 | 4.7 |
| Flammability(UL-94) | | | | | | | |
| Extinguishment time after first ignition(sec.) | 0.3 | 0.4 | 0.3 | *10.7 | *13.4 | *7.7 | 0.4 |
| Extinguishment time after second ignition(sec.) | 2.5 | 2.3 | 1.1 | *0.9 | *1.3 | *1.9 | 1.4 |
| Rating | SE-O | SE-O | SE-O | SE-II | SE-II | SE-II | SE-O |

Note:
Flame retardant (A): hexabromobenzene
do. (B): carbonate oligomer, the molecular ends of which are terminated by alkylphenols.
do. (C): tetrabromobisphenol A
do. (D): tetrabromophthalic anhydride
*Falling of burnt pieces noted.

EXAMPLE 22

The same resins as used in Examples 1 – 5 were used. After thoroughly mixing 14 parts of resin (A), 36 parts of thermoplastic resin (B) and 60 parts of polycarbonate resin (C), the mixture was extruded from an extruder along with a roving type glass fiber, thus preparing pellets containing 20 percent of glass fibers. These pellets were prepared into test pieces with an injection molding machine, and the properties of the so obtained test pieces were measured with the following results. The impact strength was 15.7 kg-cm/cm (¼-inch rod) and 20.4 kg-cm/cm (⅛-inch rod), the heat distortion temperature (264 psi) was 120.7°C., the flexural strength was 1,530 kg/cm$^2$, and the flexural modulus of elasticity was 5.63×10$^4$ kg/cm$^2$. It can thus be seen that a resinous composition excelling greatly in mechanical and thermal properties can be obtained by the addition of glass fibers to the invention composition.

What is claimed is:

1. A thermoplastic composition (D) comprising
A. a resin obtained by graft polymerizing 90 – 10 parts by weight of a monomeric mixture consisting of 90 – 10 percent by weight of a monomeric methacrylic acid ester and 10 – 90 percent by weight of an aromatic vinyl monomer, in the presence of 10 – 90 parts by weight of a polybutadiene of butadiene-styrene copolymer containing at least 50 percent by weight of butadiene unit;
B. a thermoplastic resin obtained by copolymerizing an aromatic vinyl monomer with 15 – 70 percent by weight of said aromatic monomer of a vinyl cyanide monomer; and
C. a polycarbonate resin derived from a (4,4' - dihydroxy diphenyl) alkane by the ester exchange or phosgene method;
with the provision that the ratio of the total amount contained of the resin (A) and the thermoplastic resin (B) to resin (C) is in the range of 70:30 – 10:90, and that polybutadiene or the butadiene copolymer component containing at least 50 percent by weight of butadiene unit is contained in an amount of 5 – 50 percent by weight of the total amount contained of the resin (A) and the thermoplastic resin (B).

2. A composition according to claim 1 wherein said resinous composition (D) further contains a flame retardant agent selected from the group consisting of hexabromobenzene, tetrabromobisphenol A, tetrabromophthalic anhydride and a carbonate oligomer derived from halogenated bisphenol A.

* * * * *